Dec. 22, 1953  S. C. NELSON  2,663,188
LIQUID METERING AND FLOW INDICATING DEVICE
Filed Sept. 22, 1949
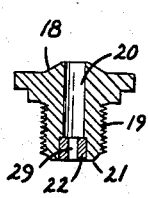
Fig. 5
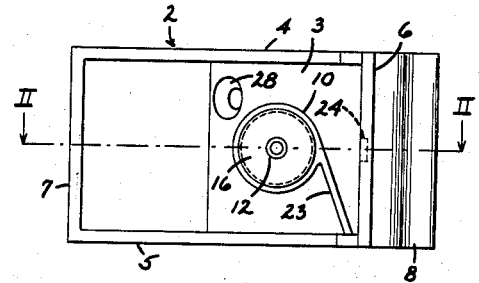
Fig. 1
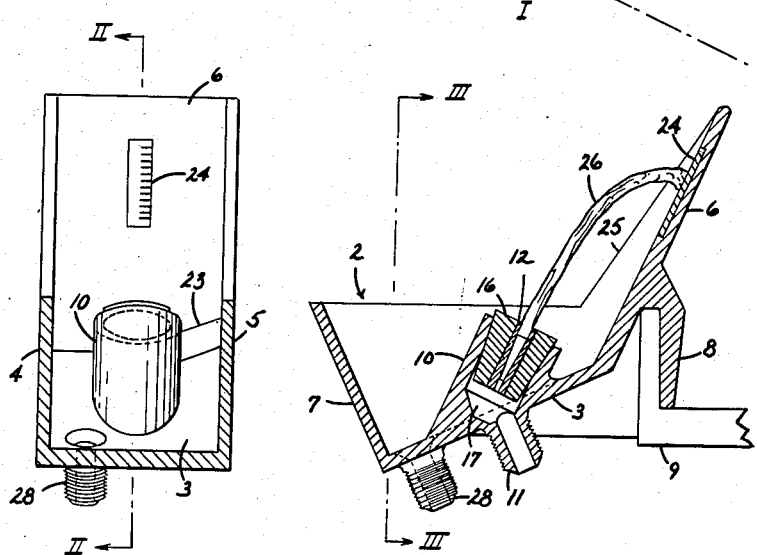
Fig. 3
Fig. 2
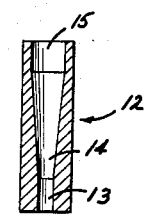
Fig. 4
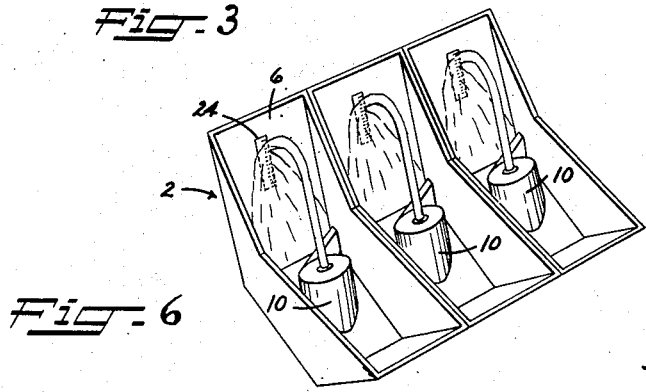
Fig. 6
INVENTOR.
SEDDON C. NELSON
BY
Thomas R. O'Malley
ATTORNEY.

Patented Dec. 22, 1953

2,663,188

UNITED STATES PATENT OFFICE 2,663,188

LIQUID METERING AND FLOW INDICATING DEVICE

Seddon C. Nelson, Fredericksburg, Va., assignor to American Viscose Corporation, Wilmington, Del., a corporation of Delaware Application September 22, 1949, Serial No. 117,254

8 Claims. (Cl. 73—195)

This invention relates to improvements in apparatus for metering liquids. More particularly, this invention relates to a simplified compact form of apparatus for metering a liquid at a constant predetermined rate and for visibly indicating the rate of flow.

Many liquid metering devices of the prior art comprise a number of moving parts that require inspection and maintenance to insure their operation. These devices usually require close observation to take readings to determine the rate of flow. Also, with these devices it is difficult to change the rate of metering when so desired.

This invention has for its principal object to provide a simplified compact form of apparatus for accurately metering the flow of a liquid at a constant predetermined rate and with which, the rate of flow may be readily determined by visual inspection.

Another object of the invention is to provide a simplified compact form of apparatus for accurately metering the flow of a liquid and with which, the rate of metering may be easily changed when so desired.

A further object of the invention is to provide a simplified compact form of apparatus for accurately metering a liquid at a constant predetermined rate which apparatus may be readily associated with other like forms of apparatus and with which the rate of metering of a number of streams of liquids may be readily determined and compared by a single visual inspection.

Other objects and advantages of the invention will be apparent from the following description and the accompanying drawing.

This invention in general comprises a container having side walls and a bottom wall, which container is open and unobstructed at the top. Removable means are positioned in one of the walls of the container for accurately metering at a constant predetermined rate a flowing stream of liquid delivered to the metering means under a constant head and for projecting the metered stream in a visible free path or trajectory through space. The metering means are readily removable so that it can be easily replaced with other size metering means whenever it is desired to change the rate at which the liquid is metered. The trajectory forming means projects the metered stream at a lower velocity than that at which it passes through the metering device so that the stream will impinge against one of the walls of the container. The metered stream is collected in the container and then is discharged to the point of use. The height of the trajectory of the metered stream is a measure of the velocity of the stream through the metering means and in turn a measure of the rate of flow. The metering devices are intended to be supplied with fluid under a constant head or pressure and thus fix the rate of flow for a given size of orifice and height of trajectory. A change in the height of trajectory indicates a change in the rate of flow, thus a change in the head or pressure of the fluid supply and, accordingly, a change in the quantity of liquid passing through the device. A calibrated scale or index is provided in the container whereby the height of the trajectory and the rate of flow of the stream may be determined by visual inspection. Where a number of different liquids are being metered a plurality of devices embodying the invention may be positioned in side by side relation so that the height of the trajectories of the streams of all the liquids being metered may be determined and compared by a single visual inspection.

In the drawing in which embodiments of the invention are shown:

Figure 1 is a top view of a form of apparatus embodying the invention, the direction of the view being shown by the arrows of the line I—I in Figure 2.

Figure 2 is a sectional view of the form of apparatus shown in Figure 1, the section being taken on the line II—II in Figure 1.

Figure 3 is another sectional view of the form of apparatus shown in Figures 1 and 2, the section being taken on the line III—III in Figures 1 and 2.

Figure 4 is an enlarged sectional view taken through the center line of the metering and trajectory forming device shown in Figure 2.

Figure 5 is a sectional view of another form of metering and trajectory forming device, the section being taken through the center line.

Figure 6 is a perspective view of a plurality of devices embodying the invention arranged in side by side relation.

Referring to Figures 1, 2, and 3 of the drawing, reference character 2 indicates generally an open top container of molded plastic or other liquid impermeable corrosion resistant material having a bottom wall 3 and side walls 4, 5, 6 and 7. The side wall 6 is higher than the other side walls and is inclined outwardly toward its free end away from the bottom and the wall at the opposite side of the container. The side wall 6 is provided with an extension 8 that is adapted to fit over a bracket 9 for supporting the container in operative position with the bottom wall inclined downwardly and with the side opposite the bracket lower than the side adjacent the bracket. The bottom wall is formed with a boss 10 that is inclined with respect to the bottom wall toward the side wall 6. The boss is drilled out or formed with a bore the axis of which is inclined with respect to the bottom wall and toward the end wall 6. The bore in the boss is connected with a conduit 11 extending substantially at a right angle to the bottom wall for supplying liquid to be metered. The liquid is delivered to the conduit under a constant head as from a weir box or the like which is not shown.

The metering and trajectory forming device generally indicated by reference character 12 which is shown as enlarged in Figure 4, is formed of a hard corrosion resistant material such as glass or the like. This device is provided with a central channel that extends through the device from one end to the other. The channel comprises a calibrated orifice portion 13 of uniform circular cross section throughout its length which serves as the metering device and a tapered portion 14 that uniformly increases in circular cross section from the orifice portion to the discharge passageway 15. The discharge passageway is of greater diameter than the orifice portion and is of uniform circular cross section throughout its length. The tapered portion of the channel and the discharge passageway comprise the trajectory forming means.

The metering and trajectory forming device is centrally mounted in and extends through a slightly tapered stopper-like member 16 of resilient yielding material such as rubber or the like. The stopper is pressed part way into the bore in the boss with the calibrated orifice adjacent the lower end of the stopper and communicating with a reservoir space 17 in the bore between the end of the stopper and the liquid supplying conduit. The stopper yieldingly engages the wall of the bore so that it may be readily removed when so desired.

An outlet 20 is provided in the bottom wall of the chamber near the lower end and adjacent the side wall 4 which may be connected to a pipe, not shown, to deliver the liquid to the desired place of use. A baffle is also provided in the container for directing liquid in the container to the outlet means comprising a web 23 extending between the boss and the side wall 5. The web as shown is preferably substantially tangential to the boss and is joined to the side wall 5 substantially at its junction with the side wall 6 to facilitate the flow of liquid in the container to the outlet.

A scale or indicia 24 to measure the height of the trajectory of the metered stream is fixed to the inclined side wall 6. The side wall 6 is also provided at each side with relatively short wing portions 25 which are in line with the side walls and slope upwardly to the top of the side wall 6 to prevent the splashing and overflow of a liquid stream directed against the side wall.

In another embodiment of the invention as shown in Figure 5 the stopper member 18 is of hard plastic or other corrosion resistant material that is threaded at 19. The bore of the boss in the container, into which the stopper is fitted is also threaded to receive the stopper. A circular bore or channel 20 of uniform diameter extends centrally all the way through the stopper. The lower portion of the stopper at 21 is formed with a circular recess concentric with the bore 20 and of greater diameter. An orifice member 22 of hard corrosion resistant material such as glass is pressed or otherwise secured in the recess in the stopper. The orifice member is formed with a calibrated centrally positioned circular orifice 23 that is of uniform diameter throughout its length. The diameter of the orifice 23 is less than the diameter of the bore in the stopper.

In the operation of the device liquid is delivered to the container member under substantially constant head and flows at a relatively low velocity into the reservoir formed by the portion of the bore between the conduit and the bottom of the stopper. The liquid then flows through the metering orifice at a relatively high constant velocity. As the liquid progresses through the trajectory forming device, its velocity decreases due to the increase in the diameter of the passageway through the trajectory forming device. The liquid is projected through the air as a stream indicated by reference character 26 the trajectory of which is clearly visible and impinges against the side wall 6. The liquid flows down the side wall into the container and is directed by the baffle or web in the container to the discharge outlet from which it is conducted to the place of use. The height of the trajectory is proportional to the square of the velocity of the stream being discharged from the trajectory forming device and is a magnified measure of the velocity and the rate at which the liquid is being metered through the calibrated orifice. The upper portion of the container being unobstructed, the trajectory may be readily seen even from a distance. Any variations in the rate of metering such as may be caused by foreign particles in the orifice or any variation of the pressure of the liquid being directed to the orifice will change the height of the trajectory. The height of the trajectory being calibrated with the rate at which the liquid is metered, the rate of metering is readily determined by measuring the height of the trajectory or its place of impingement on the side wall by the scale or other indicia that is provided.

The orifice member is calibrated to deliver the desired rate of flow and the diameter of the passageway in the trajectory forming device is proportioned to the diameter of the orifice so that the trajectory of the metered stream will always be within the confines of the container.

Whenever it is desired to change or remove an orifice, this may be readily done by removing the stopper member in which the orifice is mounted without stopping the delivery of liquid to the bore. The diameter of the bore into which the stopper fits is much larger than that of the orifice so that the velocity of flow through the bore will be low. The liquid will flow over the boss and will not be projected as a stream of any appreciable height.

When a number of different liquids are being separately metered, a number of devices embodying the invention may be associated together in side by side relation as shown in Figure 6 of the drawing so that all of the trajectories of the streams being metered may be seen from the same point of observation.

With this invention a uniform and accurate rate of flow of a single liquid or a number of separate liquids may be maintained constant during an operation extending over a long period of time.

While preferred embodiments of the invention have been shown and described, it is to be understood that changes and variations may be made without departing from the spirit and scope of the invention as defined in the appended claims.

I claim:

1. Apparatus for metering a flowing stream of liquid comprising an open top container having a bottom wall and a side wall, means connected to a lower portion of the container for directing liquid into the container comprising an upwardly extending conduit having a calibrated orifice through which a stream of the liquid passes, said conduit having an internal cross-section at the discharge end of greater diameter than the orifice for reducing the velocity of the stream of liquid as it passes beyond the orifice into the container, said conduit being inclined from the vertical toward the aforesaid side wall for projecting the stream of liquid through space in a trajectory impinging against the aforesaid side wall, and means connected to the container for discharging the liquid from the container.

2. Apparatus for metering a flowing stream of liquid comprising a container having a bottom wall and side walls, one of said side walls being higher than the others, means for directing liquid to the container, calibrated orifice means in said container through which a stream of the liquid passes, means for reducing the velocity of the stream of liquid from the orifice means and for projecting the stream of liquid through space in a trajectory extending above a side wall and impinging against the higher side wall of the container comprising a conduit connected to the orifice means having a cross-section at a discharge end greater than that of the orifice means and inclined from the vertical toward the higher side wall, and means for discharging the liquid from the container.

3. Apparatus for metering a flowing stream of liquid comprising a container having a bottom wall and side walls, means in the container having a calibrated orifice through which a stream of the liquid passes, means for directing liquid to the orifice, means for reducing the velocity of the stream of liquid from the orifice and for projecting the stream of liquid through space in a trajectory extending above a side wall and impinging against a side wall of the container comprising a conduit connected to the orifice having a cross-section at a discharge end greater than that of the orifice and inclined from the vertical toward a side wall, and outlet means connected to a wall of the container for discharging the liquid from the container, the bottom wall being sloped for directing liquid to the outlet means.

4. Apparatus for metering a flowing stream of liquid comprising a container having a bottom wall and side walls, means in the container having a calibrated orifice for metering a stream of the liquid, means for directing liquid to the metering means, means for reducing the velocity of the metered stream of liquid and for projecting the stream through space in a trajectory having a portion extending above a side wall of the container and impinging the stream against a wall of the container comprising a conduit connected to the orifice means, said conduit having a tapered portion and a discharge portion of greater cross-section than that of the metering orifice inclined from the vertical toward a side wall, and outlet means in a wall of the container for discharging the metered liquid from the container.

5. Apparatus for metering a flowing stream of liquid comprising a container having a bottom wall and side walls, one of said side walls being higher than the others, a portion of the bottom wall having a bore formed therein connected to a liquid supply means, means positioned in the bore having a calibrated orifice for metering a stream of the liquid and having means for reducing the velocity of the metered stream of liquid and projecting the stream through space in a trajectory that impinges against the higher wall of the container comprising a conduit connected to the orifice having a cross-section at a discharge end greater than that of the orifice and inclined from the vertical toward the higher side wall, outlet means in a wall of the container for discharging the metered liquid, and baffle means in the container for directing the metered liquid to the outlet means.

6. Apparatus for metering flowing streams of liquid comprising a plurality of containers positioned in side by side relation, each container having a bottom wall and side walls with the corresponding side wall of each container extending in the same direction, means in each container having a calibrated orifice for metering a stream of the liquid, means for directing liquid to each of the metering means, means for reducing the velocity of each of the metered streams of the liquid and for projecting each of the streams through space in the same general direction in a trajectory having a portion extending above a corresponding side wall of each of the containers and impinging each of the streams against the same corresponding side wall of each container comprising a conduit connected to the orifice means having a cross-section at a discharge end greater than that of the metering orifice and inclined from the vertical toward the side wall, and outlet means in each container for discharging the metered liquid.

7. Apparatus for metering a flowing stream of liquid comprising an open top container having a bottom wall and a side wall, a portion of the bottom wall having a bore formed therein connected to a liquid supply means, a readily removable resilient member positioned in the bore and having a straight bore extending therethrough in a direction inclined from the vertical toward the aforesaid side wall, a conduit within the bore of the resilient member having a calibrated orifice for metering a stream of the liquid and a channel on the downstream side of the orifice for projecting the stream through space in a trajectory that impinges against the aforesaid wall of the container, and an outlet in the bottom wall of the container for discharging the metered liquid.

8. Apparatus for metering a flowing stream of liquid comprising a container having a bottom wall and side walls, one of said side walls being higher than the others, a portion of the bottom wall having a bore formed therein connected to a liquid supply means, resilient readily removable means positioned in the bore having a straight bore extending therethrough, a conduit within the bore of the resilient means having a calibrated orifice for metering a stream of the liquid and a diverging channel on the downstream side of the orifice extending in a direction inclined from the vertical toward the higher side wall for reducing the velocity of the metered stream of liquid and projecting the stream through space in a trajectory that impinges against the higher wall of the container, outlet means in a wall of the container for discharging the metered liquid, and baffle means in the container for directing the metered liquid to the outlet means.

SEDDON C. NELSON.

References Cited in the file of this patent

UNITED STATES PATENTS

| Number | Name | Date |
| --- | --- | --- |
| 1,042,323 | Clarkson | Oct. 22, 1912 |
| 1,384,086 | Poppenhusen et al. | July 12, 1921 |
| 1,630,318 | Tate | May 31, 1927 |
| 1,831,586 | Barr | Nov. 10, 1931 |
| 1,840,608 | Slichter | Jan. 12, 1932 |
| 2,019,694 | Reitlinger | Nov. 5, 1935 |
| 2,225,513 | Summers | Dec. 17, 1940 |
| 2,343,030 | Simmons | Feb. 29, 1944 |
| 2,370,210 | Turner | Feb. 27, 1945 |
| 2,487,083 | Warshaw | Nov. 8, 1949 |